(12) United States Patent
Hoffman et al.

(10) Patent No.: US 6,224,793 B1
(45) Date of Patent: May 1, 2001

(54) ENCAPSULATED ACTIVE MATERIALS

(75) Inventors: Dwight K. Hoffman, Midland, MI (US); Steven P. Bitler, Menlo Park, CA (US)

(73) Assignees: The Dow Chemical Company, Midland, MI (US); Landec Corporation, Menlo Park, CA (US)

( * ) Notice: Subject to any disclaimer, the term of this patent is extended or adjusted under 35 U.S.C. 154(b) by 0 days.

(21) Appl. No.: 09/300,339

(22) Filed: Apr. 27, 1999

Related U.S. Application Data

(60) Provisional application No. 60/083,127, filed on Apr. 27, 1998.

(51) Int. Cl.$^7$ .............................. B01J 13/02; B01J 13/20; B01J 13/22
(52) U.S. Cl. ..................... 264/4.1; 264/4.33; 264/4.4; 427/213.3; 427/213.36; 428/402.2; 428/402.21; 428/402.22; 428/402.24
(58) Field of Search ..................... 264/4.1, 4.33, 264/4.4; 427/213.3, 213.36; 428/402.2, 402.21, 402.22, 402.24

(56) References Cited

U.S. PATENT DOCUMENTS

| | | | |
|---|---|---|---|
| 3,317,433 | 5/1967 | Eichel et al. | 252/316 |
| 4,091,130 | 5/1978 | Shaw | 427/358 |
| 4,100,148 | 7/1978 | Hockenberger et al. | 528/374 |
| 4,421,897 | 12/1983 | Gutekunst et al. | 525/119 |
| 4,461,854 | 7/1984 | Smith | 523/211 |
| 4,503,161 | 3/1985 | Korbel et al. | 502/159 |
| 4,517,337 | 5/1985 | Lockhart et al. | 524/859 |
| 4,528,354 | 7/1985 | McDougal | 528/33 |
| 4,604,444 | 8/1986 | Donnadieu et al. | 528/34 |
| 4,766,176 | 8/1988 | Lee et al. | 525/100 |
| 4,788,170 | 11/1988 | Wengrovius | 502/152 |
| 4,788,254 | 11/1988 | Kawakubo et al. | 525/100 |
| 4,954,472 | 9/1990 | Scoot et al. | 502/152 |
| 4,990,392 | 2/1991 | Goshens et al. | 428/196 |
| 5,010,119 | 4/1991 | McElrath, Jr. et al. | 523/205 |
| 5,051,521 | 9/1991 | Frances et al. | 556/94 |
| 5,075,468 | 12/1991 | Frances et al. | 556/87 |
| 5,084,543 | 1/1992 | Frances et al. | 528/58 |
| 5,102,969 | 4/1992 | Scheffler et al. | 528/48 |
| 5,120,349 | 6/1992 | Stewart et al. | 71/93 |
| 5,194,460 | 3/1993 | Evans et al. | 523/211 |
| 5,310,786 | 5/1994 | Vorlop et al. | 525/54.1 |
| 5,601,761 | * 2/1997 | Hoffman et al. | 264/4.3 |

FOREIGN PATENT DOCUMENTS

| | | |
|---|---|---|
| 2113961 | 1/1994 | (CA) . |
| 0363006 A2 | 9/1989 | (EP) . |
| WO 8505288 | 5/1985 | (WO) . |
| WO 9210285 | 6/1992 | (WO) . |
| 92/13901 | 8/1992 | (WO) . |
| WO 9609883 | 4/1996 | (WO) . |
| 96/27641 | 9/1996 | (WO) . |
| WO 9715389 | 1/1997 | (WO) . |
| 98/11166 | 3/1998 | (WO) . |

OTHER PUBLICATIONS

Oosting MS–Polymer Technology; "Opportunities to Reduce Environmental Problems Together with a Reduction of the Manufacturing Costs" pp. 1–11; Swiss Bonding Conference Paper 1997.

* cited by examiner

*Primary Examiner*—Nathan M. Nutter
(74) *Attorney, Agent, or Firm*—Noreen L. Sims

(57) ABSTRACT

The invention is an encapsulated active agent comprising an active agent encapsulated in a crystallizable or thermoplastic polymer wherein the particle size of the encapsulated active agent is 3,000 microns or less wherein the active agent is not significantly extractable from the particles under ambient conditions. In another embodiment the invention is a process for preparing an encapsulated agent which comprises a) contacting an active agent with a crystallizable or thermoplastic polymer wherein the polymer is molten and the active agent in not volatile under the contacting conditions; b) forming particles of about 3000 microns or less; and c) exposing the particles to conditions such that the portion of the particle at and near the surface undergoes rapid solidification. The encapsulated active agents of the invention do not require washing in order for them to be stable in curable compositions. These encapsulated active agents can be designed to release the active agent at a desired temperature. The encapsulated agents of the invention demonstrate excellent stability at ambient temperatures and exhibit relatively rapid reactivity upon release of the active agent. Furthermore, the presence of the encapsulating agent does not result in deterioration of adhesive or elastomer properties of a cured composition after preparation.

22 Claims, No Drawings

ENCAPSULATED ACTIVE MATERIALS

CROSS-REFERENCE TO RELATED APPLICATION

This application claims the benefit of U.S. Provisional Application No. 60/083,127 filed on Apr. 27, 1998.

BACKGROUND OF THE INVENTION

This patent application relates to encapsulated active materials, and preferably relates to encapsulated catalysts, accelerators and curing agents.

In many instances, formulations which are useful as an adhesive, sealant, coating or in composite applications, such as those based on a polysiloxane, epoxy resin, polyurethane, vinyl ester resin, polyester resin, allylic resin, polysulfide resin, phenolic resin, amino resin and the like require contact with a catalytic species, accelerators or curing agent in order to achieve final cure. This cure can begin at, or slightly above, room temperature upon immediate contact between the catalytic species, accelerator or curing agent and the curable composition. Therefore, it is necessary to keep the catalytic species, accelerator or curing agent and the curable composition from coming into contact with one another until cure is desired. One commonly used approach is to formulate two part compositions in which the catalytic species, accelerator or curing agent is in one part and the curable composition is in another part. Two part compositions require shipment of two separate portions, and may require additional capital for separate containment of the catalyst, accelerator or curing agent and the curable material along with mixing equipment to mix the materials. Separate shipment and complicated equipment, such as metering and dispensing equipment, significantly adds to the cost of such a system.

It is therefore desirable to develop one-part curable compositions, which do not require shipment in two parts or complicated equipment for mixing and application. Hoffman et al. U.S. Pat. No. 5,601,761, incorporated herein by reference, discloses a method of encapsulating an active material in a coating material immiscible therewith and having a melting point or transition point above ambient temperature. The method comprises, dispersing the active material in the coating material at a temperature sufficient to melt the coating material; forming droplets of active material interspersed with the coating material; cooling the droplets to solidify the coating material to form particles; and contacting the particles with a solvent that dissolves the active material but does not dissolve the coating material, so as to remove active material from the surface of the particles.

The need to contact the particles with solvent results from the fact that a significant amount of active material is contained on the surface of the particles formed or is extractable from the particles. This significant amount of active material on the surface or which is extractable results in a lack of stability in one-part curable formulations. As a result, the patentee removed the active material at the surface by contacting the particles containing active material with a solvent for the active material. This results in stable encapsulated active material and stable compositions containing the encapsulated active material. The problem is that washing the particles after formation results in a waste of active species which is carried away in the solvent and enhanced costs due to the extra processing step of washing the particles.

Stewart et al., U.S. Pat. No. 5,120,349, assigned to Landec Polymers, incorporated herein by reference, discloses a process for encapsulating an active species, such as a herbicide, insecticide, fungicide, or fertilizer, in side chain crystallizable acrylate based polymers. These encapsulated active agents are prepared by dissolving the polymer, or precursors of the polymer in a solvent, and dispersing the mixture in a dispersant. Thereafter, in the embodiment where the precursors to the polymer are used, the necessary ingredients are added to allow the polymer to form, either before or after dispersion of the mixture. If necessary, the mixture is heated. The encapsulated active agent particles form in the dispersion and can be separated by mechanical means. Bitler, et al WO 96/27641, incorporated herein by reference, discloses the preparation of modifying agents wherein the modifying agents comprise an active chemical moiety, such as a catalyst or a curing agent, and a crystalline polymeric moiety wherein the active chemical moiety is chemically bound to the crystalline polymeric moiety. These are prepared as disclosed in Stewart. It is disclosed that these particles can be added to modify curable systems. They modify the curable systems when exposed to heat sufficient to melt the crystalline polymeric moiety and thereby bring the active chemical moiety into contact with the curable system. This system exhibits good stability but the reactivity of this system is too slow for some applications. Bitler et al, WO 98/11166, incorporated herein by reference, discloses modifying agents for curable systems, which comprise crystalline polymers containing an active chemical ingredient, which is physically bound but not chemically bound to the polymeric ingredient. The active chemical moiety and the system are similar to those disclosed in WO 96/27641. These encapsulated active species are prepared by dissolving or dispersing the active species in a hot side chain crystallizable acrylate polymer, cooling the mixture and crystallizing the mixture. The particles formed are then ground. Landec markets a product under the name Intelimer® 5012 which is dibutyltin dilaurate encapsulated by a side chain crystallizable acrylate. The active species are located at the surface of the particle and/or are extractable from the particles. In some applications the presence of the active species at the surface of the particle or the extractability of the active material from the particles results in instability of some of the formulations containing the encapsulated active species. In curable formulations this instability is exhibited by premature curing of the curable composition. This is indicated by a growth in viscosity of the composition.

What is needed is an encapsulated agent which does not require extra processing steps after formation, such as washing and is stable in a one-part formulation for extended periods of time wherein the active species can be released upon demand by application of some external phenomena such as pressure, shear or heat. In other words, the system is stable at ambient temperatures, i.e., does not undergo significant viscosity growth indicative of curing, and which cures rapidly once the system is exposed to conditions so as to release the encapsulated active agent, such as the melting temperature of the encapsulating agent.

SUMMARY OF INVENTION

In one embodiment the invention is an encapsulated active agent in particle form comprising an active agent encapsulated in a crystallizable or thermoplastic polymer wherein the particle size of the encapsulated active agent is 3,000 microns or less wherein the active agent is not significantly extractable from the particles under ambient conditions during the first extraction after particle preparation. In a preferred embodiment the encapsulated particle has a shell layer at and near the surface which functions to prevent release of, or extraction of, the active agent at ambient temperatures. Preferably, the shell layer contains substantially no active agent or such a low level of active agent that the stability of any formulation to which it is added is not detrimentally affected. In a preferred embodiment the particles of the invention have a shell layer at and near the particle surface and an inner portion of the particle surrounded by the shell layer wherein the shell layer has a different crystal structure than the crystal structure of the inner portion such that the active agent is not substantially extractable from the particles under ambient conditions during the first extraction after particle formation. In a preferred embodiment the encapsulating agent is a crystallizable polymer, and is more preferably a side chain crystallizable polymer which comprises a polymer or copolymer of an alkyl acrylate or alkyl methacrylate wherein the polymer has substituted or unsubstituted side chains of about 6 to about 50 carbon atoms. In another embodiment the thermoplastic or crystallizable polymer has a transition point of about 40° C. to about 250° C. Preferably, the active agent is not chemically bound to the encapsulating agent.

In another embodiment the invention is a process for preparing an encapsulated agent which comprises a) contacting an active agent with a crystallizable or thermoplastic polymer wherein the polymer is molten and the active agent in not volatile or exhibits low volatility under the contacting conditions; b) forming particles of about 3000 microns or less; c) and exposing the particles to conditions such that the portion of the particle at and near the surface undergoes rapid solidification. In a preferred embodiment the invention is a process for preparing an encapsulated active agent which comprises heating a crystallizable or thermoplastic polymer under conditions such that the polymer is molten; contacting an active agent with the molten polymer to disperse or dissolve the active agent within the polymer; pouring the active agent dispersed or dissolved in the polymer on a rotating disk such that particles of the active agent in the polymer are formed, spun from the disk and solidify; wherein the active agent does not volatilize under the conditions of the process and the active agent is not significantly extractable from the formed particles at ambient conditions during the first extraction after particle formation. In yet another embodiment, the invention is the product prepared by the process described in this paragraph.

In a preferred embodiment the active agent is an encapsulated organometallic catalyst.

The encapsulated active agents of the invention do not require washing or extraction in order for them to be stable in curable compositions. These encapsulated active agents can be designed to release the active agent at a desired temperature. The encapsulated agents of the invention demonstrate excellent stability at ambient temperatures and exhibit relatively rapid reactivity upon release of the active agent. Furthermore, the presence of the encapsulating agent does not result in deterioration of adhesive or elastomer properties of a cured composition after preparation.

DETAILED DESCRIPTION OF INVENTION

The active agent can be any material which is reactive in an environment and which needs to be separated from the environment until it is desired that the active agent react in the environment. Examples of active agents include catalysts, accelerators, curing agents, biologically active compounds, such as drugs, herbicides, fertilizers or pesticides, and the like. Preferably, the active agent is a catalyst, a curing agent, an accelerator, or a mixture thereof. The active agent may be any material that dissolves in or forms a heterogeneous slurry with the encapsulating material at temperatures at which the encapsulating agent is in the liquid form, i.e. molten. Preferably, the active agent is soluble in the encapsulating material. The active agent may either be a liquid or a solid at room temperature but it is preferably a liquid at processing temperatures. The melting point of the active agent may be greater than, less than, or equal to the melting point of the encapsulating material.

Preferably, the active agent is an organometallic or organic catalyst, curing agent or accelerator which does not volatilize or degrade under the temperatures of encapsulation process. Preferably, the active agent is a silanol condensation catalyst; a hydrosilylation catalyst; a catalyst, curing agent, or accelerator useful in preparing prepolymers or thermoset resins such as, polyurethane prepolymers or polyurethane compositions, epoxy resins, vinyl ester resins, polyester resins, allylic resins, polysulfide resins, phenolic resins, amino resins and the like.

In one preferred embodiment the active agent is an organometallic catalyst which does not volatilize or degrade under the conditions of encapsulation. Other catalytic species which may be useful are catalysts which promote the moisture curing of polyurethane prepolymers. Catalysts useful in polyurethane reactions include tin carboxylates, organo silicon titanates, alkyl titanates, tertiary amines, tin mercaptides, napthenates or alkanoate salts of lead, cobalt, manganese, bismuth or iron. Urethane formation catalysts useful are well known to those skilled in the art and many examples may be found e.g., in the POLYURETHANE HANDBOOK, Chapter 3, §3.4.1 on pages 90–95; and in POLYURETHANE CHEMISTRY AND TECHNOLOGY, in Chapter IV, pages 129–217. Preferred tin compounds include tin(II) salts of organic carboxylic acids, such as tin(II) diacetate, tin(II) dioctanoate, tin(II) diethylhexanoate and tin(II) dilaurate; dialkyltin(IV) salts of organic carboxylic acids, such as dibutyltin diacetate, dibutyltin dilaurate, dibutyltin maleate and dioctyltin diacetate; and stannous salts of carboxylic acids, such as stannous octoate, stannous oleate, stannous acetate, and stannous laurate. Other catalysts useful in promoting the curing of polyurethanes include dimorpholinodialkyl ethers, N-alkylbenzylamines, N-alkylmorpholines, N-alkyl aliphatic polyamines, N-alkylpiperazines, triethylenediamine, amidines, such as 2,3-dimethyl-3,4,5,6-tetrahydropyrimidine, tertiary amines, such as triethylamine tributylamine, dimethylbenzylamine, N-methyl-, N-ethyl-, N-cyclohexlmorpholine, N,N,N'N,N'-tetramethylethylenediamine, N,N,N',N'-tetramethylbutanediamine, N,N,N',N'-tetramethyl-1,6-hexanediamine, pentamethyldiethylenetriamine, tetramethyldiaminoethyl ether, bis(dimethylaminopropyl) urea, dimethylpiperazine, 1,2-dimethylimidazole, 1-azabicyclo[3.3.0]octane, and 1,4-diazabicyclo[2.2.2] octane.

Active agents useful in this invention include silanol condensation catalysts, which promote the reaction of the reactive silicon groups. Examples of silanol condensation catalysts are titanic acid esters, such as tetrabutyl titanate, tetrapropyl titanate, etc.; organotin compounds, such as dibutyltin dilaurate, dibutyltin maleate, dibutyltin diacetate, tin octylate, tin naphthenate, dialkyl tin oxides, reaction products of dialkyltin oxide and phthalic acid esters or alkane diones, dialkyltin bis(acetylacetonate) (also commonly referred to as dialkyl tin acetylacetonates); organoaluminum compounds, such as aluminum trisacetylacetate, aluminum trisethylacetate, diisopropoxyaluminum ethyl acetate, etc.; reaction products of bismuth salts and organic carboxylic acids, such as bismuth tris(2-ethylhexoate), bismuth tris(neodecanoate), etc.; chelate compounds, such as zirconium tetracetylacetonate, titanium tetraacetylacetonate, etc.; organolead compounds, such as lead octylate; organovanadium compounds; amine compounds, such as butylamine, octylamine, dibutylamine, monoethanolamine, diethanolamine, triethanolamine, diethylenetriamine, triethylenetetramine, oleylamine, cyclohexylamine, benzyl amine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,1-diazabicyclo(5,4,0)undecene-7 (DBU), etc., or their salts with carboxylic acid, etc.; low-molecular-weight polyamide resins obtained from excess polyamines and poly basic acids; reaction products of excess polyamines and epoxy compounds; etc. These silanol catalysts may be used individually or in combinations of 2 or more. Among these silanol condensation catalysts, organometallic compounds or combinations of organometallic compounds and amine compounds are preferable from the point of view of curability. Preferred silanol condensation catalysts are organometallic compounds. More preferred are organotin compounds, such as dibutyl tin oxide, dibutyltin dilaurate, dibutyltin maleate, dibutyltin diacetate, tin octylate, tin naphthenate, reaction products of dibutyltin oxide and phthalic acid esters, dibutyl tin bis (acetylacetonate), and the like.

In another embodiment, the active agent may be a curing accelerator for an epoxy resin composition. Such accelerator is preferably an urea or an imidazole. Preferred ureas include, 3-phenyl-1,1-dimethylurea; 3-(4-chlorophenyl)-1,1-dimethylurea; 3-(3,4-dichlorophenyl)-1,1-dimethylurea; 1,1'-(4-methyl-m-phenylene)bis(3,3'-dimethylurea); 3-isomethyldimethylurea-3,5,5-trimethylcyclohexyldimethylurea; or 4,4'-methylenebis (phenyldimethylurea). The most preferred urea is 3-phenyl-1,1-dimethylurea (PDMU). Preferred imidazoles include alkyl- or arylimidazoles, such as 2-methylimidazole, 2-undecylimidazole, 2-heptadecylimidazole, 2-phenylimidazole, 2-ethylimidazole, 2-isopropylimidazole and 2-phenyl-4-methylimidazole; 1-cyanethyl derivatives, such as 1-cyanoethyl-2-methylimidazole, 1-cyanoethyl-2-phenylimidazole, 1-cyanoethyl-2-undecylimidazole, and 1-cyanoethyl-2-isopropylimidazole; and carboxylic salts, such as 1-cyanoethyl-2-ethyl-4-methylimidazole-trimellitate. Other catalysts for the curing of epoxy resin compositions which may be useful as active agent in this invention include those disclosed in U.S. Pat. No. 5,344,856, relevant portions incorporated herein by reference.

In another embodiment the active agent may be a hydrosilylation catalyst. Such hydrosilylation catalysts are described in U.S. Pat. No. 5,567,833 at Column 17, lines 26 to 54; U.S. Pat. No. 5,409,995; U.S. Pat. No. 3,971,751; and U.S. Pat. No. 5,223,597 incorporated herein by reference. The most preferred hydrosilylation catalyst is chloroplatinic acid.

In yet another embodiment the active agent can be an amine or an imidazole which functions as a catalyst, curing agent or accelerator in a polymeric curing reaction. Included in the useful amines are primary, secondary and tertiary amines as described herein.

In another embodiment the active agent is a free radical catalyst or initiator. Free radical catalysts and initiators are well known in the art, examples are disclosed in U.S. Pat. No. 4,618,653; and U.S. Pat. No. 5,063,269 at column 6, lines 37 to 54, incorporated herein by reference.

Preferably, the active agent is an organometallic compound, more preferably the active agent is an organotin compound. Even more preferably the organotin compounds useful are dialkyltin oxides such as dibutyltin oxide, dialkyltin bis(acetylacetonate), or the reaction product of dibutyltin oxide with a phthalic ester or pentanedione.

In the embodiment wherein the active agent is an organic based active agent, care must be taken to make sure that the organic active agent and encapsulating agent are chosen such that the organic active agent can be encapsulated within the encapsulating agent at a temperature at which the organic active agent does not volatilize. The use of an encapsulating agent that the active agent is soluble in reduces the volatility of the active agent and enhances the formation of the desired particles. Does not volatilize herein means that under the conditions of the encapsulated active agent particle formation the formed particle does not exhibit substantial extraction of the active agent at ambient conditions during the first extraction after particle formation. Preferably the active agent has a low partial pressure under particle formation conditions. Active agents exhibit enhanced solubility in encapsulating agents having a polar nature, such as, for example, polyester, polyamides, and side chain crystalline polymers.

The encapsulating agent is a thermoplastic or crystallizable polymer, which has a transition point from about 40° C. to about 250° C. Transition point as used herein refers to the point at which the thermoplastic or crystallizable polymer undergoes a change, which results in the release of the active agent. One transition point is where the thermoplastic or crystallizable polymer melts and releases the active agent. Another transition point is where the thermoplastic or crystallizable polymer changes sufficiently to allow the active agent to permeate out of the particles. It is preferable that the thermoplastic or crystallizable polymeric moiety should cross over the transition point, for instance melt, over a relatively small temperature range so that release of the active agent can occur quickly. Preferably, the thermoplastic or crystallizable polymer has a transition point at a temperature of about 40° C. or greater, more preferably about 50° C. or greater and most preferably about 60° C. or greater. Preferably such thermoplastic or crystallizable polymer has a transition point at about 250° C. or less more preferably about 200° C. or less and most preferably about 110° C. or less. Preferably, the encapsulating agent is a crystalline polymer.

Preferable thermoplastic polymers include styrenics, styrene acrylonitriles, low molecular weight chlorinated polyethylenes, soluble cellulosics, acrylics, such as those based on methyl methacrylate or cycloaliphatic acrylates.

Preferably, the crystalline polymer is a polyolefin, polyester, polyamide, phenoxy thermoplastic, polylactic acid, polyether, polyalkylene glycol or a side chain crystallizable polymer. More preferably the crystallizable polymer is a polyethylene, polypropylene, polyether, polyethylene glycol, phenoxy thermoplastic, polylactic acid or side chain crystallizable polymer. Even more preferably the crystallizable polymers are polyethylene, polyethylene glycol or a side chain crystallizable polymer, with side chain acrylate polymers being most preferred.

The crystallizable polymer can be derived from a single polymer or from a mixture of polymers, and the polymer can be a homopolymer, or a copolymer of two or more comonomers, including random copolymers, graft copolymers, block copolymers and thermoplastic elastomers. Preferably, at least part of the crystallizable polymer is derived from a side chain crystallizable (SCC) polymer. The SCC polymer may e.g. be derived from one or more acrylic, methacrylic, olefinic, epoxy, vinyl, ester-containing amide-containing or ether-containing monomers. The preferred SCC polymeric moieties are described in detail below. However, the invention includes other crystalline polymers having the desired properties. Such other polymers include e.g. polymers in which the crystallinity results exclusively or predominantly from the polymer backbone, e.g. polymers of α-olefins containing 2 to 12, preferably 2 to 8, carbon atoms, e.g. polymers of monomers having the formula $CH_2$=CHR, where R is hydrogen, methyl, propyl, butyl, pentyl, 4-methylpentyl, hexyl or heptyl, as well as other polymers such as polyesters, polyamides, and polyalkylene oxides, e.g. polytetrahydrofuran. Crystallinity such that the DSC heat of fusion is at least 10 J/g, particularly at least 20 J/g, is preferred. The steric nature of the polymeric moiety can also be significant in determining the availability of the active moiety.

SCC polymer moieties which can be used in this invention include moieties derived from known SCC polymers, e.g. polymers derived from one or more monomers such as substituted and unsubstituted acrylates, methacrylates, fluoroacrylates, vinyl esters, acrylamides, methacrylamides, maleimides, α-olefins, ρ-alkyl styrenes, alkylvinyl ethers, alkylethylene oxides, alkyl phosphazenes and amino acids; polyisocyanates; polyurethanes; polysilanes; polysiloxanes; and polyethers; all of such polymers contain long chain crystallizable groups. Suitable SCC polymers are described e.g. in J. Poly. Sci. 60,19 (1962), J. Poly. Sci. (Polymer Chemistry) 7, 3053 (1969), 9, 1835, 3349, 3351, 3367, 10, 1657, 3347, 18, 2197, 19,1871, J. Poly. Sci. Polymer Physics Ed. 18,. 2197 (1980), J. Poly. Sci. Macromol. Rev. 8, 117 (1974), Macromolecules 12, 94 (1979), 13, 12, 15, 18, 2141, 19, 611, JACS 75,3326 (1953), 76; 6280, Polymer J. 17, 991 (1985); and Poly. Sci. USSR 21, 241 (1979).

The SCC polymer moieties, which are preferably used in this invention, can be broadly defined as moieties which comprise repeating units of the general formula:

where Y is an organic radical forming part of the polymer backbone and Cy comprises a crystallizable moiety. The crystallizable moiety may be connected to the polymer backbone directly or through a divalent organic or inorganic radical, e.g. an ester, carbonyl, amide, hydrocarbon (e.g. phenylene), amino, or ether link, or through an ionic salt linkage (e.g. a carboxyalkyl ammonium, sulfonium or phosphonium ion pair). The radical Cy may be aliphatic or aromatic, e.g. alkyl of at least 10 carbons, fluoralkyl of at least about 6 carbons or p-alkyl styrene wherein the alkyl contains about 6 to about 24 carbons. The SCC moiety may contain two or more different repeating units of this general formula. The SCC may also contain other repeating units, but the amount of such other units is preferably such that the total weight of the crystallizable groups is at least equal to, e.g. twice, the weight of the remainder of the block.

Preferred SCC moieties comprise side chains containing in total at least about 5 times as many carbon atoms as the backbone of the moiety, particularly side chains comprising linear polymethylene moieties containing about 12 to about 50, especially about 14 to about 22 carbon atoms, or linear perfluorinated or substantially perfluorinated polymethylene moieties containing 6 to 50 carbon atoms. Polymers containing such side chains can be prepared by polymerizing one or more corresponding linear aliphatic acrylates or methacrylates, or equivalent monomers such as acrylamides or methacrylamides. A number of such monomers are available commercially, either as individual monomers or as mixtures of identified monomers, e.g. C12A, C14A, C16A, C18A, C22A, a mixture of C18A, C20A and C22A, a mixture of C26A to C40A, fluorinated C8A (AE800 from American Hoechst) and a mixture of fluorinated C8A, C10A and C12A (AE12 from American Hoechst). The polymers can optionally also contain units derived from one or more other comonomers preferably selected from other alkyl, hydroxyalkyl and alkoxyalkyl acrylates, methacrylates (e.g. glycidal methacrylates); acrylamides and methacrylamides, acrylic and methacrylic acids; acrylamide; methacrylamide; maleic anhydride; and comonomers containing amide groups. Such other co-monomers are generally present in total amount less than about 50 percent particularly less than about 35 percent especially less than about 25 percent, e.g. about 0 to about 15 percent. They may be added to modify the transition point or other physical properties of the polymers. The transition point of a polymer containing such polymethylene side chains is influenced by the number of carbon atoms in the crystallizable side chains. For example, homopolymers of C14A, C16A, C18A, C20A, C22A, C30A, C40A and C50A respectively, typically have melting points of 20, 36, 49, 60, 71, 76, 96 and 102° C., while the homopolymers of the corresponding n-alkyl methacrylates typically have melting points of 10, 26, 39, 50, 62, 68, 91 and 95° C. Copolymers of such monomers generally have intermediate melting points. Copolymers with other monomers, e.g. acrylic acid or butyl acrylate, typically have somewhat lower melting points.

Other polymers which can provide SCC moieties for use in this invention include atactic and isotactic polymers of n-alkyl α-olefins (e.g. the atactic and isotactic polymers of $C_{16}$ olefin, having $T_m$'s of 30° C. and 60° C. respectively); polymers of n-alkylglycidyl ethers (e.g. the polymer of $C_{18}$ alkyl glycidylether); polymers of n-alkyl vinyl ethers (e.g. the polymer of $C_{18}$ alkylvinylether having a $T_m$ of 55° C.; polymers of n-alkyl-α-epoxide having a $T_m$ of 60° C.); polymers of n-alkyl oxycarbonylamido-ethylmethacrylates (e.g. the polymers of $C_{18}$ IEMA, $C_{22}$ IEMA and $C_{30}$ IEMA having $T_m$'s of 56° C., 75° C. and 79° C. respectively); polymers of n-fluoro alkyl acrylates (e.g. the polymers of $C_8$ hexadecafluoroalkylacrylate, and of a mixture of $C_{8-12}$ alkyl fluoroacrylates having $T_m$'s of 74° C. and 88° C. respectively); polymers of n-alkyloxazolines (e.g. the polymer of $C_{16}$ alkyl oxazoline having a $T_m$ of 155° C.); polymers obtained by reacting an hydroxyalkyl acrylate or methacrylate with an alkyl isocyanate (e.g. the polymers obtained by reacting hydroxyethyl acrylate with $C_{18}$ or $C_{22}$ alkyl isocyanate and having $T_m$'s of 78° C. and 85° C. respectively); and polymers obtained by reacting a difunctional isocyanate, a hydroxyalkyl acrylate or methacrylate, and a primary fatty, alcohol (e.g. the polymers obtained by reacting hexamethylene diisocyanate, 2-hydroxyethyl acrylate, and $C_{18}$ or $C_{22}$ alcohols, and having $T_m$'s of 103° C. and 106° C. respectively).

Preferred SCC polymer moieties used in this invention comprise about 30 to about 100 percent preferably about 40 to about 100 percent, of units derived from at least one monomer selected from the group consisting of alkyl acrylates, alkyl methacrylates, N-alkyl acrylamides, N-alkyl methacrylamides, alkyl oxazolines, alkyl vinyl ethers, alkyl vinyl esters, α-olefins, alkyl 1,2-epoxides and alkyl glycidyl ethers in which the alkyl groups are n-alkyl groups containing 12 to 50 carbon atoms, and the corresponding fluoroalkyl monomers in which the thermoalkyl groups are n-fluoroalkyl groups containing about 6 to about 50 carbon atoms; about 0 to about 20 percent of units derived from at least one monomer selected from the group consisting of alkyl acrylates, alkyl methacrylates, N-alkyl acrylamides, alkyl vinyl ethers, and alkyl vinyl esters in which the alkyl groups are n-alkyl groups containing about 4 to about 12 carbon atoms; and about 0 to about 15 percent of units derived from at least one polar monomer selected from the group consisting of acrylic acid, methacrylic acid, itaconic acid, acrylamide, methacrylamide, acrylonitrile, methacrylonitrile, vinyl acetate and N-vinyl pyrrolidone. Such SCC moieties may also contain units derived from other monomers to change compatibility with the matrix, or to raise the modulus of a reaction product containing the modifying agent; such monomers include styrene, vinyl acetate, mono acrylic functional polystyrene and the like. Preferably, the side chain crystalline polymers used do not contain a significant amount of functional groups, such as those having active hydrogen atoms, as the presence of a significant amount of active hydrogen atoms increases the viscosity of the polymers and this can negatively impact the process used to prepare the encapsulated active agent particles.

The number average molecular weight of the SCC polymer moiety is preferably less than about 200,000, more preferably less than about 100,000, particularly less than about 50,000, more particularly about 1,000 to about 20,000. The molecular weight of the SCC polymer moiety can be adjusted (e.g. through choice of the reaction conditions and addition of chain transfer agents) so as to optimize the reactivity of attached moieties without substantial change in Tm.

The encapsulated active agent may be prepared by the following procedures: a) dispersing or dissolving the active agent in the encapsulating material at a temperature sufficient to melt the encapsulating material and not so high that the active agent volatilizes; b) forming droplets of active agent interspersed with the encapsulating material; and c) cooling the droplets to solidify the encapsulated material. Optionally, the process may further comprise d) contacting the droplets with a solvent that dissolves the active agent but does not dissolve the encapsulating material, so as to remove active agent from the surface of the encapsulating material. It is preferable to avoid this last step. This process is described in U.S. Pat. No. 5,601,761 incorporated herein by reference. More particularly the encapsulating agent is heated until it is in the liquid state, i.e. molten. Thereafter, the active agent is dispersed in the encapsulating agent. Preferably, the active agent is not volatile under the conditions at which the encapsulating agent is molten. The mixture is formed into particles, preferably of about 3000 microns or less. Any means for taking a liquid composition or dispersion and forming it into particles or droplets of the desired size may be used, for instance atomization of the particles by any means or by dropping the liquid composition on a rotating disk. Thereafter the particles are exposed to conditions wherein the surfaces of the particles rapidly solidify. Rapidly solidify means that the active agent in the particles formed are not substantially extractable from the particles formed at ambient conditions in a first extraction after particle formation. Further evidence of rapid soldification is the formation of a shell about the particle wherein the encapsulating agent has a different crystal structure than the interior portion of the particle. Generally rapid solidification means the particles solidify at the surface in a matter of seconds, preferably about 10 seconds or less and more preferably about 5 seconds or less. It is believed that exposing the particles to rapid quenching results in the desired structure and properties of the particles. Any means of allowing the particles to rapidly solidify at the surface may be used. Passing the particles through a zone of air or an inert gas at ambient temperatures or a cooled zone is one method of rapidly solidifying the surface of the particles. Any process which disperses particles of the molten formulation it on a cooling zone, such as an air zone, may be used.

In performing this process the temperature of the process is selected such that the encapsulating agent is in a molten or liquid form and has a suitable viscosity for the processing technique used, such as rotating disk. Further the temperature and other process conditions should be chosen that the active agent is not volatile. Generally not volatile or low volatility as used herein means the active agent has a low partial pressure. One skilled in the art can readily determine appropriate conditions and components and acceptable volatility levels. In general preferred temperatures at which the active agent is contacted with the encapsulating material is about 40° C. or greater, more preferably about 100° C. or greater, most preferably about 120° C. or greater and preferably about 250° C. or less, more preferably about 200° C. or less and most preferably about 180° C. or less.

A preferred process for preparation of the particles is a rotating disk process. In a rotating disk process it is preferable that the mixture prepared have a viscosity, which is suitable for use with the rotating disk. Preferably, the viscosity of the material is about 500 centipoise or less, more preferably about 100 centipoise or less and most preferably about 50 centipoise or less. In order to achieve the desired viscosity for processing of highly viscous polymers, it may be necessary to add a solvent or plasticizer to the mixture. This is not preferred in that the presence of solvent can result in added cost and safety and environmental issues. In a preferred embodiment of this process the active agent dissolves in the molten polymer. It is believed that this provides for better dispersion and distribution and reduces volatility of the active agent. The active agent is preferably mixed with a encapsulating agent in the molten state at a temperature at which the active agent or a mixture thereof is not volatile. Under these circumstances, the particle prepared will not exhibit significant extraction of the active agent at ambient temperatures. This results in a very stable encapsulated active agent and a very stable adhesive formulation prepared from such active agent. Preferably, the temperature of the molten mixture which is poured on the disk is about 75° C. or greater, more preferably about 100° C. or greater and most preferably about 120° C. or greater and is preferably about 250° C. or less, more preferably about 200° C. or less and most preferably about 180° C. or less. Preferably the disk is rotating at about 500 rpm or greater, more preferably about 1,000 rpm or greater and most preferably about 5,000 rpm or greater. The upper limit on the disk rotation speed is practicality.

In one preferred embodiment the encapsulated active agent preferably exhibits a shell of crystalline polymer about a mixture of polymer having dispersed therein an active agent. The crystal structure of this shell layer is different than the crystal structure of the encapsulating agent crystal structure at the interior of the particle. Preferably there is not a significant amount of active agent in the shell at and near the surface of the particle. It is believed that this shell layer at and near the surface prevents the extraction of the active agent by a solvent for the active agnet. The presence of this layer is indicated by the active agent not being extractable in a significant amount when the particles are contacted with a solvent for the active agent. The ability of the particle to resist extraction of the active agent using a solvent is an indication that the encapsulated active agent will be stable in a formulation at ambient temperatures, meaning significant amounts of the active agent will not come into contact with the curable composition and initiate cure at ambient temperatures. In one preferred embodiment it is believed that the encapsulated active agent of the invention preferably has a shell of crystalline polymer which has a crystal structure which is somewhat different than the structure of the polymer on the interior of the particle. Preferably, the active agent is not significantly extractable from the particles of active agent in encapsulating agent. By not substantially extractable is meant that there is no need to wash the surface of the particle with a solvent to make the particle stable in the adhesive formulation. Preferably, not substantially extractable means 10 percent or less of the active agent based on the amount of active agent in the encapsulated active agent is extracted by a solvent or plasticizer when the particles are contacted with the solvent or plasticizer for the active agent, more preferably 5 percent or less, even more preferably 1 percent or less, even more preferably 0.5 percent by weight or less and most preferably about 0.1 percent by weight or less. In some embodiments the amount of active agent extracted is below the detection limits of the analytical techniques used to measure for the active agent as demonstrated in Example 36 herein. The active agent upon release can rapidly activate or initiate reaction or cure. Preferably, the particles have a particle size of about 3000 microns or less, more preferably about 300 microns or less even more preferably about 150 microns or less, and most preferably about 70 microns or less. Preferably, the particles have a particle size of about 10 microns or more, more preferably about 30 microns or more and even more preferably about 50 microns or more. It is believed that a narrow particle size distribution enhances the performance of the particles of the invention in the intended uses. Preferably the particles demonstrate a narrow particle size distribution. Narrow particle size distribution means herein that there are not a significant amount of particles with a a size greater than 5 times the median particle size of the particles, and more preferably 2 times the median particle size. Particle size as used herein can be measured by laser scattering particle size analysis as disclosed in Example 36. In a preferred embodiment the particles have a low aspect ratio and even more preferably are spherical in shape. The concentration of active agent in the encapsulating agent particles is preferably about 1 weight percent or greater, more preferably about 20 weight percent or greater and most preferably about 25 weight percent or greater. The concentration of active agent in the particles is preferably about 70 weight percent or less, more preferably about 65 weight percent or less, even more preferably to about 50 weight percent or less, and most preferably to about 45 weight percent or less based on the total weight of active agent and encapsulating material.

The encapsulated active agents of the invention exhibit rapid activation times. Activation time means the time it takes for the curing reaction to start as exhibited by the onset of gellation. This time is measured from the time the composition is exposed to a means of causing the encapsulating agent to release the active agent, such as a heat source, to the time at which noticeable gellation occurs. The encapsulated active agents exhibit activation times which approach the activation times of unencapsulated active agents. Thus the encapsulation of the active agent does not significantly slow the activation of the curable composition. In a preferred embodiment the formulation containing the encapsulated active agent begins cure after exposure to activation conditions for about 10 minutes or less and more preferably about 5 minutes or less and most preferably about 5 minutes or less.

The encapsulated active agents of the invention can be used in any environment where there is the need for a controlled release of the active material. The encapsulated agent can be mixed into a formulation of the reactive components and other adjuvants. To activate the reaction the formulation is exposed to conditions, which release the active agent. Such conditions may be exposure to the necessary temperature at which the encapsulating material melts or which the active agent is able to permeate through the encapsulating agent. Alternatively, the conditions could be shear or exposure to ultrasonic waves, which cause the encapsulating material to release the active material. The encapsulated active agents of the invention can be used in adhesive and coating formulations.

The encapsulated active agents of the invention demonstrate excellent stability in curable formulations. Formulations containing the encapsulated active agents preferably demonstrate stability for greater than 3 days when exposed to ambient conditions (about 23° C. and about 50 percent relative humidity) and even more preferably for 5 days or greater. Stability means that the composition is not fully cured and preferably means the composition has not undergone significant cross-linking as evidenced by viscosity growth.

SPECIFIC EMBODIMENTS

The following examples are included for illustrative purposes only and do not limit the scope of the claims. Unless otherwise stated, all parts and percentage are by weight.

EXAMPLE 1

A $C_{22}$ polyacrylate homopolymer (available from Landec Corporation Menlo Park California), (800 g) was heated to molten (m.p.>70° C.) and Neostann® U-220 dibutyltin bis(acetyl acetonate) (200 g) was added. The tin catalyst was soluble in the molten polymer and the solution was heated to 130° C. The solution of tin catalyst in polyacrylate was pumped at a rate of 132 g/min on to the surface of a rotating disk that had been heated to 125° C. and was rotating at a rate of about 15,000 rpm. The molten solution formed particles, which were spun into ambient air in a collection room over a period of about 7 to 8 minutes. The particles settled to the floor and were collected on "butcher" paper. The final product was a yellow powdery solid having particle sizes ranging from about 20–80 microns as observed under a light microscope.

EXAMPLE 2

In the same manner as described in Example 1, a copolymer of a $C_{22}$ acrylate monomer and 1 percent acrylic acid (available from Landec Polymers Menlo Park Calif.) lot no. I0011 (800 g), was heated to molten (m.p.>70° C.) and Neostann® U-220 dibutyltin bis(acetyl acetonate) (200 g) was added. Again, the tin catalyst was soluble in the molten polymer and the solution was heated to 155° C. The solution of tin catalyst in polyacrylate was pumped at a rate of 132 g/min on to the surface of a rotating disk that had been heated to 159° C. The molten solution formed particles, which were spun into ambient air in a collection room over a period of about 7 minutes. The particles formed settled to the floor and were collected on butcher paper. The final product was a beige powdery solid having particle sizes ranging from about 20 to 80 microns as observed under a light microscope.

The encapsulated tin catalysts were formulated into model silicone room temperature vulcanizable (RTV) formulations and evaluated for stability and reactivity.

Formulation 1.

5.0 g Kaneka S-303H methoxysilyl-terminated polypropyleneoxide based polyether 2.0 g Palatinol 711P mixed linear alkyl phthalate plasticizer 0.175 g Encapsulated Neostann U-220 tin catalyst prepared as described in Example 1t Comparison Formulation 1.

5.0 g Kaneka S-303H methoxysilyl-terminated polypropyleneoxide based polyether 2.0 g Palatinol 711P mixed branched alkyl phthalate plasticizer 0.035 g Neostann U-220 tin catalyst (not encapsulated)

At room temperature conditions, Formulation 1 had 16–17 days storage stability without gelation. However, Comparison Formulation 1 gels within hours.

After storage for 17 days and heating Formulation 1 for 2.5 minutes on a hot plate set at 100° C., cure is triggered and gelation occurs within hours (overnight).

EXAMPLE 3 to 35

Several encapsulated active agents were prepared from various encapsulating agents and catalytic materials. The encapsulating agent's catalytic materials are listed below. In Table 1 is a list of the encapsulated active materials made, the loading level, particle size and process temperature. The process for preparing the particles is as described in Example 1.

Encapsulating Materials

A. 8,000 mol. wt. Poly(ethylene glycol)

B. Blend of 95% by weight 5,000 mol. wt. Methoxy Poly(ethylene glycol) and 5% by weight 100,000 mol. wt. Poly(ethylene oxide)

C. Blend of 98% by weight 5,000 mol. wt. Methoxy Poly(ethylene glycol) and 2% Monamide S D. Blend of 95% by weight 8,000 Poly(ethylene glycol) and 5% by weight Poly(ethylene oxide)

E. Polywax 500 polyethylene wax $C_{22}$ side chain crystalizable Polyacrylate Homopolymer available form Landec Polymers F. $C_{22}$ side chain crystalizable Polyacrylate with 1 percent carboxyl containing acrylate groups.

Catalysts

A. Neostann® U-220 dibutyltin bis(acetylacetonate)

B. Dibutyltin bis(2-ethylhexanoate)

C. Dibutyltin Oxide

TABLE 1

| Example No. | Shell | Core | Loading, % | Disk Rate RPM | Feed Rate g/min | Particle Size, micron | Process Temp. deg C. |
|---|---|---|---|---|---|---|---|
| 3 | A | A | 30 | 13,000 | 100 | 5–125 | 75 |
| 4 | A | A | 30 | 14,000 | 100 | 5–125 | 75 |
| 5 | B | A | 30 | 14,000 | 100 | <300 | 80 |
| 6 | C | A | 30 | 14,000 | 100 | <300 | 80 |
| 7 | B | A | 20 | 14,000 | 100 | <300 | 100 |
| 8 | B | B | 30 | 14,000 | 100 | <300 | 100 |
| 9 | D | A | 30 | | | 20–710 | 105 |
| 10 | B | A | 30 | 13,000 | 100 | 20–710 | 90 |
| 11 | B | A | 30 | 13,000 | 100 | 20–710 | 90 |
| 12 | E | A | 20 | 12,000 | 110 | 20–125 | 120 |
| 13 | E | A | 20 | 12,000 | 110 | 25–125 | 120 |
| 14 | E | C | 20 | 12,000 | 110 | 25–125 | 120 |
| 15 | F | A | 20 | 15,000 | 130 | 15–90 | 130 |
| 16 | G | A | 20 | 15,000 | 130 | 15–90 | 150 |
| 17 | G | A | 20 | 15,000 | 130 | <100 | 150 |
| 18 | G | A | 50 | 15,000 | 130 | <100 | 150 |
| 19 | G | A | 40 | 15,000 | 130 | <100 | 150 |
| 20 | G | A | 30 | 15,000 | 130 | <100 | 150 |
| 21 | G | A | 10 | 15,000 | 130 | <100 | 150 |
| 22 | G | D | 20 | 15,000 | 130 | <100 | 150 |
| 23 | F | A | 20 | 15,000 | 130 | <100 | 150 |
| 24 | H | A | 20 | 15,000 | 130 | 15–125 | 150 |
| 25 | H | A | 20 | 15,000 | 130 | 20–100 | 150 |
| 26 | F | A | 20 | 15,000 | 130 | 20–100 | 150 |
| 27 | F | A | 20 | 15,000 | 130 | 20–100 | 150 |
| 28 | F | A | 20 | 15,000 | 130 | 20–100 | 150 |
| 29 | F | A | 20 | 15,000 | 130 | 20–100 | 150 |
| 30 | F | A | 20 | 15,000 | 130 | 20–100 | 150 |
| 31 | F | A | 20 | 15,000 | 130 | 20–100 | 150 |
| 32 | F | A | 20 | 15,000 | 130 | 20–100 | 150 |
| 33 | F | A | 20 | 15,000 | 130 | 20–100 | 150 |
| 34 | F | A | 20 | 15,000 | 130 | 20–100 | 150 |
| 35 | None | | | 15,000 | 130 | | 150 |

EXAMPLE 36 and COMPARATIVE EXAMPLES A AND B

Three formulations were made to compare encapsulated catalysts of the invention to encapsulated catalysts prepared according to the disclosure of WO 98/11166. Model Formulation 1 was used as the basis for the testing. Samples were mixed by hand until the resin and plasticizer were homogeneous and the capsules were well dispersed. The encapsulating agent is which is a $C_{22}$ side chain polyacrylate polymer having a weight average molecular weight of 12,000 and a number average molecular weight 7,000. The catalyst is dibutyl tin acetylacetonate sold under the Trademark and Designation of Neostann U-220 by Nitto Denko. The particles contained 80 percent by weight of encapsulating agent and 20 percent by weight of catalyst. The theoretical tin level of the encapsulated tin particles was 5.5 percent by weight. In Example 36 the encapsulated catalyst was prepared using the process as described in Example 1. In Comparative Example A the encapsulated catalyst was prepared using the process described in WO 98/11166 see Examples 1 and 4. In Comparative Example B a spray drying process was used to prepare the encapsulated catalyst.

Each sample was tested for tin level, particle size, reactivity, stability and extractability of the catalyst. The following test procedures were used.

The elemental tin analysis was performed by the Neutron Activation Method. Samples and standards are irradiated in a neutron field to create radioactive isotopes of the elements of interest. These radioactive isotopes decay by the emission of gamma radiation characteristic of the activated elements. In the case of tin, two isotopes emit gamma rays with energies of 160 and 332 KeV. The half-lives of these two isotopes are 40.1 and 9.6 minutes, respectively. Following some decay period, the gamma radiation spectra from each of the samples and standards are measured using high purity germanium detectors. After correcting for decay of the radioactive isotopes, the peak areas of the gamma rays of interest (i.e. 160 and 332 KeV) are compared to those of a standard of known concentration. The ratio of the peak areas is then used to calculate the concentration of the element of interest in the sample.

Known amounts of each sample are loaded into 2-dram polyethylene vials, dispersed in high purity graphite, and then sealed. Loading known amounts into 2-dram vials, diluting the standards to the appropriate volume with high purity water, and then sealing the vials prepare standards. The samples and standards are then irradiated for 10 minutes at a power level of 10 kilowatts in a "Lazy Susan" facility of the nuclear reactor. Following a 10 minute decay, their respective gamma radiation spectra are acquired for 400 seconds using two high purity germanium detectors using a computer-based multi-channel analyzer. Tin concentrations are calculated using Canberra™ software and standard comparative techniques. The following nuclear reactions were used for the determination of tin in the catalyst samples;

$^{122}$Sn (n, γ)    $^{123m}$Sn; $T_{1/2}$ = 40.1 minutes; γ energy:    160 KeV;
$^{124}$Sn (n, γ)    $^{152m}$Sn; $T_{1/2}$ = 9.6 minutes; γ energy:    332 KeV Particle sizes were determined by using a Horiba LA 910 Laser Scattering Particle Size Analyzer. Samples were prepared by dispersing the capsules in Isopar G with 0.1% Aerosol OT 100. Samples were sonicated to break up the agglomerates.

Particle sizes of samples were also analyzed using a light obscuration based particle size analyzer. The equipment included a Climet CI-1000 signal processor and either an RLV2-100EH or RLV5-250EH sensor. The samples were prepared by taking approximately 0.15 gram of material and placing it in a 25 ml vial. 3–5 ml of 1% Triton X-100 in isopropanol was added to the dry powder to wet the particles. The dispersion was then sonicated for approximately 30 seconds to break up any agglomerate. Approximately 20 ml of water were then added to the dispersion to further dilute it. The dispersion was passed through a 250-micron (60-mesh) sieve to remove any large. Approximately 0.1 ml of the dilute dispersion that passed through the sieve was added to approximately 225 ml of water and this final dispersion was delivered to a light obscuration based particle size analyzer, i.e. a Climet CI-1000 equipped with a sensor. The accuracy of the measurement was evaluated by analyzing monodisperse samples of polystyrene spheres.

For reactivity studies, approximately 2–2.5 g samples of formulations are poured into 1.4 g aluminum weighing pan. Activation of the capsules is accomplished by placing the pan on a hot plate heated to 100° C. for 2.5 minutes. The sample is then stored on a lab bench at ambient conditions and monitored for gelation. The time for a gel to form after activation is recorded.

For stability studies, approximately 2–2 g samples of formulations are poured into 1.4 g aluminum weighing pan. Samples were placed in an oven set at 85° F. The time for a gel to form is recorded.

The recipe to perform extraction studies is 10 parts by weight of capsules and 90 parts by weight of heptane. Capsules and heptane were added to an Erlenmeyer flask. The dispersion of capsules was mixed at room temperature in a capped flask equipped with a magnetic stirrer bar for 30 minutes. The sample was filtered on a Buchner funnel that had a disk of No. 1 Whatman filter paper, dried and analyzed for tin.

Table 2 shows the elemental tin analysis for each of the samples.

TABLE 2

| Example | Description | Elemental Tin, % |
|---|---|---|
| Comparative A | Air Milled | 5.78 ± 0.1 |
| Comparative B | Spray Dried | 5.43 ± 0.1 |
| Example 36 | Rotating Disk | 5.48 ± 0.06 |

Table 3 tabulates the particle sizes of the capsules as determined by a light obscuration based particle size analyzer as described above.

TABLE 3

Particle Size of the Capsules

| Example | Description | No. Ave., μm | Area Ave., μm | Vol. Ave., μm | Vol. Median, μm |
|---|---|---|---|---|---|
| Comp A | Air milled | 9.0 | 20.0 | 49.5 | 27.7 |
| Comp B | Spray Dried | 10.6 | 40.7 | 108.2 | 67.4 |
| 36 | Rotating Disk | 22.5 | 49.6 | 61.0 | 59.7 |

Comparative Experiment A (air milled) and Comparative Experiment B (spray dried) had significant amounts of particles that were retained on a 250 mm sieve. In particular, Samples from Comparative Experiment B had very large particles present. Example 36 prepared by the rotating disk method has a narrower particle size distribution than either of the other two samples. Overall, the rotating disk sample has a much lower fraction of particles greater than 250 microns.

The particle size of the comparative encapsulated catalysts used were also determined using a Horiba LA 910 Laser Scattering particle size analyzer by dispersing the powder in Isopar G with 0.1 Aerosol OT 100. The samples were sonicated to break up agglomerated particles. The results are compiled in Table 4.

TABLE 4

| Example | Description | Run 1 | Run 2 | Run 3 |
|---|---|---|---|---|
| Comp. A | Air milled | 48 | 52 | 31 |
| Comp B | Spray Dried | 41 | 46 | 51 |

Table 5 shows a performance comparison in terms of both reactivity and stability of the encapsulated catalysts.

TABLE 5

| Example | Description | Reactivity, min | Stability, Days |
|---|---|---|---|
| Comparative A | Air Milled | <2 | <<0.25 |
| Comparative B | Spray Dried | <90 | <2 |
| 36 | Rotating Disk | 0* | >21 |

*Gelled on hot plate

A comparison of the results shows that the catalyst of Example 36 prepared by the rotating disk process clearly has better stability and reactivity than either of the samples prepared by air milling (Comparative A) or spray drying (Comparative B).

Table 6 shows the results of the extraction studies.

TABLE 6

| Example | Description | Tin % Before Washing | Tin % After Washing | Tin Lost % | Stability days |
|---|---|---|---|---|---|
| Comp A | Air milled | 5.78 ± 0.1 | 3.77 ± 0.05 | 35 | <2 |
| Comp B | Spray Dried | 5.43 ± 0.1 | 5.14 ± 0.09 | 35 | <2 |
| 36 | Rotating Disk | 5.38 ± 0.06 | 5.59 ± 0.09 | 0 | >21 |

Heptane is a good solvent for Neostann U-220 tin catalyst; but, a poor solvent for the Intelimer 8065 side chain crystalline acrylate polymer. Thus, washing capsules with heptane is expected to either remove tin catalyst remaining on the capsule surface or extract tin from the capsule interior. Based on this, a correlation is expected between these test results and the stability of the formulations. The best stability (>21 days) is obtained with the Example 36 (rotating disk) sample which also has the lowest level of lost tin. The results demonstrate that preparation of capsules according to Example 36 (rotating disk) is superior to the preparation according to Comparative Example A or B (air milling or spray drying methods).

The particle size distribution is narrower with a lower fraction of particles greater than 250 microns for the Example 36 (rotating disk) sample. The reactivity is greater for the Example 36 (rotating disk) sample with cure being obtained on the hot plate in this series of experiments. The Comparative Example A (air milled) sample had reactivity approaching that for the Example 36 (rotating disk) sample. The Comparative Example B (spray dried) sample had much lower reactivity. The stability of the Example 36 sample prepared by rotating disk is better than either the Comparative Example A (air milled) or Comparative Example B (spray dried) samples. The Comparative Example B (spray dried) sample had stability that was superior to the Comparative Example A (air milled) sample. The combination of stability and reactivity was best for the Example 36 (rotating disk) sample, excelling the performance either the Comparative Example A (air milled) or Comparative Example B (spray dried) sample in both reactivity and stability studies. The performance of the two comparative samples indicates that the two process techniques used for their preparation give a tradeoff in performance between stability and reactivity. This difference correlates with particle size. That is, the larger particles prepared according to Comparative Example B (spray drying) have lower reactivity and higher stability than the particles prepared according to Comparative Example A (air milled). There is a correlation between stability and extractable tin catalyst. The very low levels of extractable tin obtained in Example 36 (rotating disk) correlate with much greater stability.

EXAMPLES 37 AND 38 AND COMPARATIVE EXAMPLES C TO J

Formulations according to Formulation 2 were prepared with the three encapsulated catalysts as described in Example 36 and Comparative Examples A and B and with unencapsulated dibutyl tin bisacetylacetonate Neostan™ U220 available from Nitto. Formulation 2 comprises 100 parts by weight of Kaneka S-303H methoxysilyl-terminated polypropyleneoxide based polyether, 40 parts by weight of a mixed alkyl phthalate plasticizer, Platinol™ 711P plasticizer and 3.416 part of encapsulated catalyst or 0.5 parts of unencapsulated catalyst. In addition the same four catalyst systems were tested in Formulation 3. Formulation 3 comprises 99 parts by weight of Kaneka S-303H methoxysilyl-terminated polypropyleneoxide based polyether, 1 part by weight of water and 3 parts by weight of encapsulated catalyst or 0.6 parts by weight of unencapsulated catalyst. The formulations were tested according to the following procedures. The sample formulations, 7 grams, are heated on a hot plate set at 100° C. for 2.5 minutes and the time until the formulation gelled was recorded. The tack free time of the samples were noted and recorded. The time until the formulation cured was noted and recorded. Seven grams of each formulation is exposed to 85° F. and the time until a gel forms is recorded. The results are compiled in Table 7.

TABLE 7

| Example | Formulation | Catalyst Type | Gel Time min | Tack Free Time min | Cure Time min | Stability min |
|---|---|---|---|---|---|---|
| Comp. C | 1 | Unencapsulated | 4 | 7 | 30 | 7 |
| Comp. D | 1 | Unencapsulated | 4 | 7 | 30 | 7 |
| 37 | 1 | Rotating Disk | 3 | 12 | 180 | 10400 |
| Comp E | 1 | Spray Dried | 25 | 48 | 400 | 1800 |
| Comp F | 1 | Air Milled | 3 | 13 | 185 | 800 |
| Comp G | 2 | Unencapsulated | 2.5 | 5 | 8 | 6 |
| Comp. H | 2 | Unencapsulated | 2.5 | 5 | 8 | 6 |
| 38 | 2 | Rotating Disk | 3 | 20 | 160 | 9600 |
| Comp. I | 2 | Spray Dried | 10 | 65 | 520 | 1680 |
| Comp H | 2 | Air milled | 3 | 18 | 150 | 640 |

The formulations described in Table 6 were also subjected to the following tests. The time for the formulation to reach 50,000 centipoise was measured using a Brookfield viscometer model LVT with spindle number 4 at 25° C. For the short time periods the samples were measured continuously and for the longer times samples were spot tested. Ten gram samples in aluminum pans were tested for gel time at 25° C. The gel time was determined by the time at which the sample could be touched with a spatula and the spatula remained dry. The tack free time was the time at which the sample no longer had surface tack, dry surface feel. Cure time was determined at 25° C. was determined to be the time to reach 90 percent of the ultimate heat cured properties as measured by a Shore A durometer. The results are compiled in Table 8.

TABLE 8

| Example | Formulation | Catalyst Type | Time to 50K cps mins | Gel Time min | Tack Free Time hrs | Cure Time hrs |
|---|---|---|---|---|---|---|
| Comp. C | 1 | Unencapsulated | 3.4 | 10 | 2 | 8 |

TABLE 8-continued

| Example | Formulation | Catalyst Type | Time to 50K cps mins | Time Gel Time min | Tack Free Time hrs | Cure Time hrs |
|---|---|---|---|---|---|---|
| Comp. D | 1 | Unencapsulated | 3.5 | 10 | 2 | 8 |
| 37 | 1 | Rotating Disk | 90 | >10080 | >168 | >168 |
| Comp E | 1 | Spray Dried | 1500 | 2100 | 120 | 140 |
| Comp F | 1 | Air Milled | 40 | 420 | 10 | 20 |
| Comp G | 2 | Unencapsulated | 4 | 8 | 1 | 5 |
| Comp. H | 2 | Unencapsulated | 4 | 8 | 1 | 5 |
| 38 | 2 | Rotating Disk | 120 | >10080 | >168 | >168 |
| Comp. I | 2 | Spray Dried | 400 | 1900 | 100 | 120 |
| Comp H | 2 | Air milled | 35 | 40 | 4 | 18 |

What is claimed is:

1. An encapsulated active agent comprising an active agent in a crystallizable polymer wherein the particle size of the encapsulated active agent is 3000 microns or less wherein the active agent is soluble in the crystallizable polymer or does not volatilize at the temperature of the encapsulation process; wherein about 1 percent by weight or less of the active agent is extractable from the particles under ambient conditions during a first extraction after particle formation when the particles are contacted with a solvent for the active agent which solvent is not a solvent for the crystallizable polymer.

2. An encapsulated active agent according to claim 1 wherein the active agent is soluble in the crystallizable polymer and does not volatilize at the temperature of the encapsulation process.

3. An encapsulated active agent according to claim 2 wherein the particles have a shell layer at and near the particle surface.

4. The encapsulated active agent according to claim 3 wherein the shell layer does not contain a significant amount of active agent.

5. An encapsulated active agent according to claim 3 wherein the particles have a shell layer at and near the particle surface and an inner portion of the particle surrounded by the shell layer wherein the shell layer has a different crystal structure than the crystal structure of the inner portion such that about 1 percent by weight or less of the active agent is extracted from the particles under ambient conditions during the first extraction after particle formation when the particles are contacted with a solvent for the active agent which solvent is not a solvent for the crystallizable polymer.

6. The encapsulated active agent according to claim 1 wherein the crystalline polymer is a polyolefin, polyester, polylactic acid, phenoxy thermoplastic, polyamide, or a side chain crystallizable polymer.

7. The encapsulated active agent according to claim 6 wherein the crystalline polymer is a side chain crystallizable polymer which comprises a polymer or copolymer of an alkyl acrylate or alkyl methacrylate wherein the polymer has substituted or unsubstituted side chains of about 6 to about 50 carbon atoms.

8. The encapsulated active agent according to claim 7 wherein the polymer or copolymer comprises a $C_{22}$ side chain alkyl acrylate.

9. The encapsulated active agent according to claim 8 wherein the polymer is a $C_{22}$ side chain alkyl acrylate homopolymer.

10. The encapsulated active agent of claim 2 wherein the active agent is an organometallic catalyst.

11. The encapsulated active agent of claim 2 wherein the active agent is a catalyst useful in curing a polyurethane or in a silicone condensation reaction.

12. The encapsulated active agent according to claim 11 wherein the active agent is dibutyltin bisacetonylacetonate, dibutyl tin dilaurate, dibutyl tin diacetate, dibutyl tin oxide, or an adduct of dibutyl tin oxide and a phthalic acid ester.

13. The encapsulated active agent of claim 10 wherein the active agent is an organotin compound.

14. The encapsulated active agent according to claim 13 wherein the active agent is dibutyltin oxide, dialkyltin bis (acetylacetonate), or the reaction product of dibutyltin oxide with a phthalic ester or pentanedione.

15. A process for preparing an encapsulated agent which comprises
    a) contacting an active agent with a crystallizable polymer wherein the polymer is molten and the active agent is not volatile under the contacting conditions and the active agent is soluble in the crystallizable polymer;
    b) forming particles of about 3000 microns or less; and
    c) exposing the particles to conditions such that the portion of the particle at and near the surface undergoes rapid solidification such that the particle formed has a different crystal structure at and near the surface of the particle wherein about 1 percent or less by weight of the active agent is extractable from the particles under ambient conditions during a first extraction after particle formation wherein the particles are extracted by a solvent for the active agent which solvent is not a solvent for the crystallizable polymer.

16. A process for preparing an encapsulated active agent which comprises heating a crystallizable polymer under conditions such that the polymer is molten; contacting an active agent with the molten polymer to dissolve the active agent within the polymer; pouring the active agent dissolved in the polymer on a rotating disk such that particles of the active agent in the polymer are formed, spun from the disk and solidified; wherein the active agent does not volatilize under the conditions of the process and is soluble in the polymer and less than 1 percent by weight of active agent is extracted from the particles formed when extracted with a solvent for the active agent which solvent is not a solvent for the polymer.

17. A process for preparing an encapsulated active agent according to claim 16 wherein the crystalline polymer is a polyolefin, polyester, polyamide, polylactic acid, phenoxythermoplastic polymer or a side chain crystallizable polymer.

18. A process for preparing an encapsulated active agent according to claim 17 wherein the crystalline polymer is a side chain crystallizable polymer which comprises a polymer or copolymer of an alkyl acrylate or alkyl methacrylate wherein the polymer has substituted or unsubstituted side chains of about 6 to about 50 carbon atoms.

19. A process for preparing an encapsulated active agent according to claim 18 wherein the polymer or copolymer comprises a $C_{22}$ side chain alkyl acrylate.

20. A process according to claim 18 wherein the active agent is an organometallic catalyst.

21. A process according to claim 20 wherein the active agent is an organotin compound.

22. A process according to claim 21 wherein the active agent is dibutyltin oxide, dialkyltin bis (acetylacetonate), or the reaction product of dibutyltin oxide with a phthalic ester or pentanedione.

* * * * *